United States Patent Office 3,491,971
Patented Jan. 27, 1970

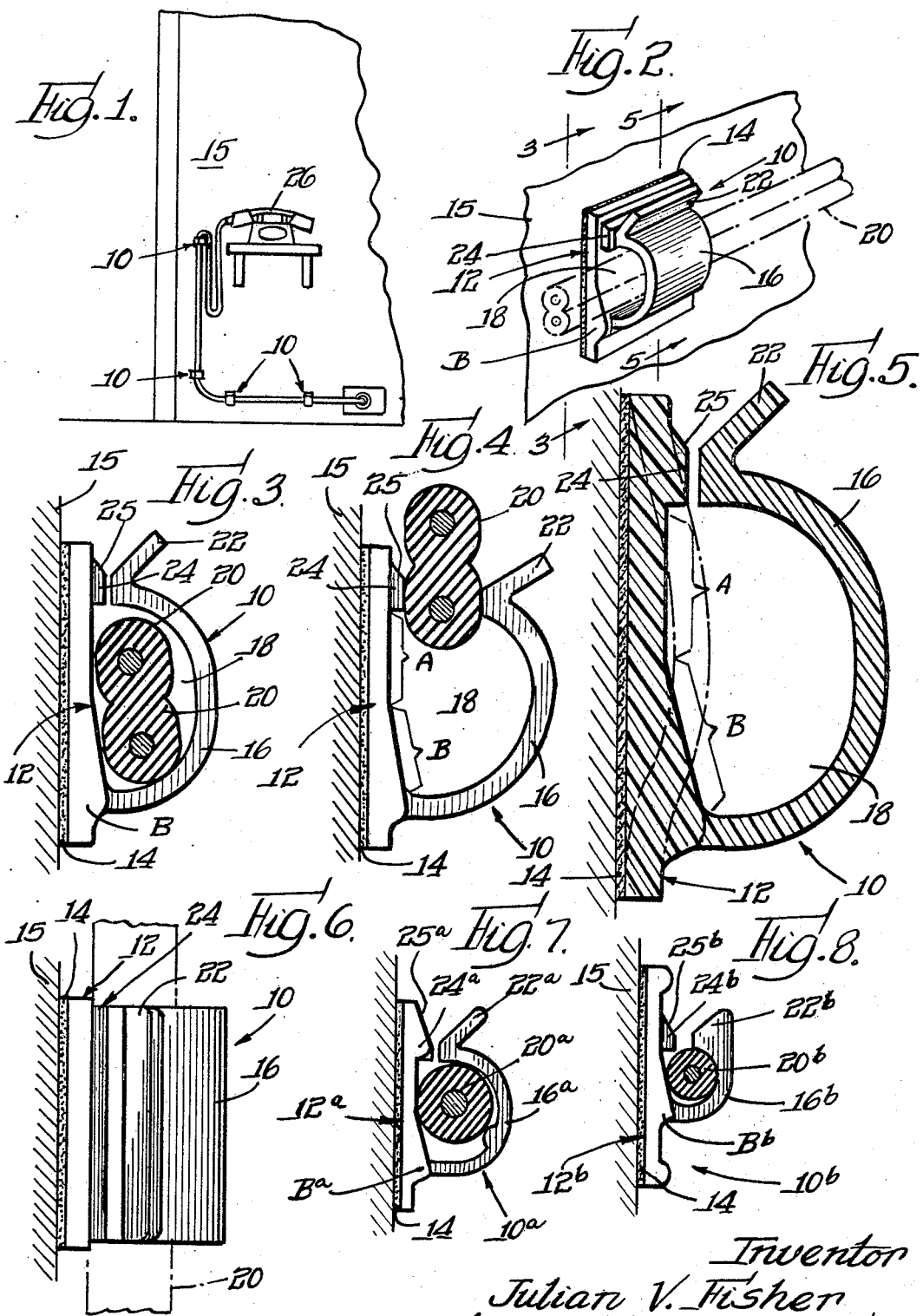

3,491,971
SPRING CLIP
Julian V. Fisher, Carpentersville, Ill., assignor to Illinois Tool Works Inc., Chicago, Ill., a corporation of Delaware
Filed Jan. 22, 1968, Ser. No. 699,502
Int. Cl. F16g 11/02
U.S. Cl. 248—65       4 Claims

ABSTRACT OF THE DISCLOSURE

The present invention relates generally to spring clips for supporting workpieces such as electrical conductors and the like. An embodiment disclosed in this application consists of a base plate member having one side which is adapted for adhesive attachment to the surface of a support member. The clip also includes an integral, laterally flexible arm which superimposes the outer side of the base plate member. One extremity of the arm has a hinged connection with the base plate member in the vicinity of the margin thereof, the inner free extremity of the arm normally positioned adjacent the base plate and laterally yieldable outwardly to permit the insertion between the arm and plate of a member to be supported, as for example an electrical conductor. In the vicinity of the hinged connection the base plate is provided with a reinforced area which is so shaped as to counteract lateral forces tending to cause the intermediate portion of the base plate to spring away from the supporting surface to which it is adhesively attached when the free extremity of the arm is forced outwardly.

DISCLOSURE OF INVENTION

The present invention contemplates the provision of a very simple, yet practical clip device for securing such elements as electrical conductors, conduits, and the like, to a supporting surface. In this connection, the invention is particularly concerned with the provision of clips which are adapted to be adhesively secured to a work surface.

With the advent and development of adhesives of the pressure-sensitive type, it has been common practice to secure a wide variety of parts to a supporting surface by employing pressure-sensitive adhesive material applied to a portion of the part. In instances where the part to be secured in place is, after attachment, subjected to forces having a tendency to pull the part away from its supporting surface, it is important that the design of the part be such as to resist such forces, and thus prevent inadvertent or unauthorized detachment thereof. To this end the present invention contemplates a spring-type clip having an arm, the free extremity of which must be forced outwardly to permit insertion or removal of the workpiece. Such outward flexing of the arm transmits forces to the arm supporting base plate which, if not counteracted, will have a tendency to cause said plate to buckle, or spring away from the supporting surface. The present invention contemplates a clip of improved practical construction wherein a portion of the base plate in the vicinity of the area of juncture of the arm and plate is of novel design.

It is, therefore, an important object of the present invention to provide a spring-type clip of the type referred to above wherein, without increasing the area of contact of the base of the clip, forces developed as an incident to outward springing of the clip arm will not cause separation of the base of the clip from a supporting surface to which it has been adhesively secured.

The foregoing, and other objects and advantages, will be more apparent when considered in connection with the accompanying drawing, wherein:

FIG. 1 indicates one practical application of a clip constructed in accordance with the present invention, namely to hold telephone conductor wires in place;

FIG. 2 is a perspective view of a clip constructed in accordance with the teachings of the present invention, said clip being shown as adhesively attached to the surface of a support member;

FIG. 3 is an enlarged, vertical, transverse sectional view taken substantially along the line 3—3 of FIG. 2, an electrical conductor being held in position by the clip;

FIG. 4 is a view similar to FIG. 3, showing the manner in which the free extremity of the clip arm must be sprung outwardly to permit insertion of an electrical conductor element;

FIG. 5 is an enlarged, transverse, sectional view of the clip taken substantially along the line 5—5 of FIG. 2, dot-and-dash lines indicating the bulged or outwardly sprung position of the intermediate portion of a clip base plate of substantially uniform thickness, approximately the thickness of the flexible arm.

FIG. 6 is a plan view of the clip as shown in FIG. 3, said view being taken substantially along the line 6—6 of FIG. 3; and FIGS. 7 and 8 are views similar to FIG. 3, showing slightly modified forms of clips for accommodating conductor elements of relatively small cross section, as distinguished from the conductor element shown in the other figures.

Referring now to the drawing more in detail, wherein like numerals have been employed to designate similar parts throughout the various views, it will be seen that one embodiment of the present invention is illustrated as a clip designated generally by the numeral 10 in FIGS. 1–6, inclusive. This clip 10 is preferably formed from electrically insulating material such as a suitable plastic material having firm resiliency. The clip 10 includes a base plate portion 12 having on one side thereof a layer of pressure-sensitive adhesive material 14, for securing the plate to the surface of a support member 15.

Formed integral with and extending outwardly from a margin of the base plate 12 is a resilient arm member 16. The shape of the arm 16 is such as to provide a chamber or space 18 to accommodate an elongated workpiece, such as an insulated conductor member 20. The upper or free extremity of the arm 16 is preferably formed with an outwardly flaring lip portion 22 to facilitate outward flexing of the arm 16. When the arm is pressed outwardly to the position shown in FIG. 4, a sufficient space is presented for accommodating the conductor member 20.

Particular attention is directed to the structural design and arrangement of the base plate member 12. The portion of the plate 12 indicated within the bracket A of FIG. 4 has a thickness approximating that of the arm 16, whereas the portion included within the bracket B increases from the thickness of A to a point of maximum thickness at the point of juncture of the arm 16 with the base. Adjacent the margin of the plate, oppositely disposed from the margin connected with the arm 16, is a thickened portion presenting an abutment 24 which has an upper inclined or flaring edge surface 25. The novel structural arrangement of the base plate 12 contributes materially to the satisfactory functioning of the clip 10. Experience has shown that in instances where a base plate of uniform thickness conforming substantially with the thickness of the resilient arm is employed, there is ever-present the tendency for the plate to buckle, or spring outwardly, away from adherence to the support surface as indicated by the dot-and-dash line of FIG. 5. With the progressive increase of thickness of the plate member 12 within the area B, forces resulting from the outward flexing of the arm 16 are so transmitted to the base member 12 as to counteract or resist effectively any tendency for such forces to cause involuntary or unauthorized release of the plate from the surface of the support member 15.

The dot-and-dash line in FIG. 5 illustrates the manner in which a base plate not incorporating applicant's invention may become detached from a supporting surface. Forces tending to loosen the base plate 12 are indicated by directional arrows. The novel reinforced base plate structure of the present invention makes it possible to employ a base plate of minimum size. In fact, the clip disclosed herein will operate satisfactorily with the use of a base plate which is substantially equal in area to the surface adapted to be superimposed by the yieldable arm. In other words, the present invention makes it possible to assure firm attachment of the clip with a minimum area of adhesive-covered surface. Hence the clip may be produced with a minimum amount of material without impairing the effectiveness of the adhesively coated side of the base plate.

FIGURES 7 and 8 disclose slightly modified forms of clips adapted to accommodate smaller workpieces, such as a conductor member indicated by the numeral 20a in FIG. 7 and 20b in FIG. 8. The structural elements of the clips disclosed in FIGS. 7 and 8 which function similarly to like elements previously described are identified by corresponding numerals bearing the suffix *a* for the clip shown in FIG. 7, and the suffix *b* for the clip shown in FIG. 8.

In FIG. 1, a telephone hand set 26 and the wires connected therewith are disclosed to illustrate one practical application of clips constructed in accordance with the teachings of the present invention. In such installations, the clips may be used to retain the telephone cords in any desired position.

From the foregoing, it will be apparent that the present invention contemplates a one-piece, spring-type, plastic clip of extremely simple, yet practical form. The design of the above-described clip lends itself for manufacture by the practice of conventional methods of molding plastic. By incorporating applicant's novel structural arrangement of the base plate, the amount of material used in molding the clip is reduced to a minimum and, at the same time, the holding power of the adhesively-coated side of the base plate is maintained at a high level. Resistance to forces tending to detach the base plate from a supporting surface as an incident to the outward springing or flexing of the clip arm is assured. The flaring surfaces presented by the upper edge surface 26 of the abutment 24 of the base plate, and the adjacent oppositely flaring surface of the lip 22, materially facilitate the ease with which a workpiece such as an electrical conductor may be inserted within the clip. The outer surface of the lip 22, which flares away from the plane of the base plate, provides a very convenient surface area for manual engagement to flex the arm outwardly.

While for purposes of illustration clips of specific form and design have been disclosed herein, it should be understood that the present invention contemplates other modifications and changes.

The invention is claimed as follows:

1. A one piece spring clip formed of electrically insulating material for supporting a workpiece, such as an electrical conductor or the like, including a base plate member having a first side presenting a surface for adhesive attachment to a support member, an integral laterally flexible arm member superimposing the opposite second side of said base plate, one extremity of said arm having an integral hinged connection with said second side in the vicinity of a margin thereof, the inner free extremity of said arm normally positioned adjacent said second side and laterally yieldable outwardly to permit insertion, between said arm of plate member, of a member to be supported, as for example an electrical conductor, said base including a section superimposed by the free extremity of said arm conforming generally in thickness with the thickness of the arm and in the vicinity of the hinged connection having a predetermined reinforcment area of increased thickness to counteract lateral forces tending to cause the intermediate portion of said plate member to spring away from a supporting surface to which it is adhesively attached, when the free extremity of the arm is forced outwardly.

2. A one piece spring clip as set forth in claim 1, wherein said reinforcement area in transverse section progressively increases in thickness from said base section to a maximum thickness at the juncture of the arm therewith.

3. A one piece spring clip as set forth in claim 1, wherein the arm superimposes substantially the entire area defined by the base plate.

4. A one-piece spring clip as set forth in claim 1, wherein a second thickened base plate area of limited extent in the form of an abutment is provided adjacent the margin of the base plate adjacently superimposed by the free extremity of the arm.

References Cited

UNITED STATES PATENTS

| 2,658,247 | 11/1953 | Heuer | 24—73 |
| 3,074,677 | 1/1963 | Eckhardt | 248—74 |
| 3,309,052 | 3/1967 | Borisof | 24—67 X |
| 3,409,257 | 11/1968 | Elm | 248—65 |

CHANCELLOR E. HARRIS, Primary Examiner

U.S. Cl. X.R.

24—73; 248—205